USOO9781158B1

(12) United States Patent
Wittenstein

(10) Patent No.: US 9,781,158 B1
(45) Date of Patent: Oct. 3, 2017

(54) INTEGRATED PARONYMOUS NETWORK ADDRESS DETECTION

(71) Applicant: EMC Corporation, Hopkinton, MA (US)

(72) Inventor: Andreas Wittenstein, Granada (ES)

(73) Assignee: EMC IP Holding Company LLC, Hopkinton, MA (US)

(*) Notice: Subject to any disclaimer, the term of this patent is extended or adjusted under 35 U.S.C. 154(b) by 56 days.

(21) Appl. No.: 14/872,135

(22) Filed: Sep. 30, 2015

(51) Int. Cl.
H04L 29/06 (2006.01)
H04L 29/08 (2006.01)

(52) U.S. Cl.
CPC ...... H04L 63/1466 (2013.01); H04L 63/1425 (2013.01); H04L 67/02 (2013.01)

(58) Field of Classification Search
CPC ..... H04L 63/00; H04L 63/08; H04L 63/0876; H04L 63/10; H04L 63/104; H04L 63/12; H04L 63/126; H04L 63/14; H04L 63/1408; H04L 63/1425; H04L 63/1466; H04L 63/1483; H04L 63/30; H04L 2463/121
See application file for complete search history.

(56) References Cited

U.S. PATENT DOCUMENTS

| 5,978,568 | A | 11/1999 | Abraham et al. |
| 7,308,709 | B1 | 12/2007 | Brezak, Jr. et al. |
| 7,752,301 | B1 | 7/2010 | Maiocco et al. |
| 7,814,542 | B1 | 10/2010 | Day |
| 8,108,924 | B1 | 1/2012 | Eberhard |
| 8,756,684 | B2 | 6/2014 | Frantz et al. |
| 2002/0010855 | A1 | 1/2002 | Reshef et al. |
| 2003/0159063 | A1 | 8/2003 | Apfelbaum et al. |
| 2004/0030752 | A1 | 2/2004 | Selgas et al. |
| 2004/0199576 | A1 | 10/2004 | Tan |

(Continued)

OTHER PUBLICATIONS

PCT/U011/026720 filed Mar. 1, 2011 Applicant: Silvertail Systems. Int'l Search Report and Written Opinion (Apr. 20, 2011).

(Continued)

Primary Examiner — Eric W Shepperd
(74) Attorney, Agent, or Firm — BainwoodHuang

(57) ABSTRACT

Improved techniques involve comparing paronymous addresses received in transaction data with trusted sets of paronymous data stored in a database by both a trusted client computer and a trusted server computer. Along these lines, the trusted client computer sends data packets to the trusted server computer that contain network addresses and a secure identifier. In response, the trusted server computer sends acknowledgment data packets containing encrypted network addresses and the secure identifier. Upon sending the acknowledgement data packets, the server computer communicates the network addresses to an aggregator. When the client computer receives the acknowledgement data packets, the client computer communicates the network addresses to the aggregator. Once the aggregator receives transaction data containing paronymous addresses, the aggregator compares the paronymous addresses to those communicated to it by the trusted server and client computers. Based on the comparison, the aggregator determines the likelihood that the paronymous addresses are legitimately synonymous.

19 Claims, 6 Drawing Sheets

(56) References Cited

U.S. PATENT DOCUMENTS

| | | |
|---|---|---|
| 2004/0199791 A1 | 10/2004 | Poletto et al. |
| 2005/0108444 A1 | 5/2005 | Flauaus et al. |
| 2005/0210288 A1* | 9/2005 | Grosse ................ H04L 63/0272 726/5 |
| 2007/0189329 A1* | 8/2007 | Latvala ............. H04L 29/12358 370/466 |
| 2008/0201772 A1* | 8/2008 | Mondaeev .......... H04L 63/1408 726/13 |
| 2009/0013210 A1 | 1/2009 | McIntosh et al. |
| 2009/0144102 A1 | 6/2009 | Lopez |
| 2010/0083354 A1* | 4/2010 | Tsirtsis .............. H04L 29/12783 726/5 |
| 2011/0214187 A1* | 9/2011 | Wittenstein ......... H04L 63/1425 726/25 |
| 2011/0302653 A1* | 12/2011 | Frantz ................... G06F 21/552 726/22 |
| 2012/0173710 A1* | 7/2012 | Rodriguez ............ H04L 43/026 709/224 |
| 2014/0149569 A1* | 5/2014 | Wittenstein ............. H04L 43/12 709/224 |
| 2014/0173153 A1* | 6/2014 | Channagiri Nagendra ........... G06F 13/4063 710/300 |
| 2016/0224291 A1* | 8/2016 | Ishino ................... G06F 3/1238 |
| 2016/0255047 A1* | 9/2016 | Parthasarathy ..... H04L 61/3025 |

OTHER PUBLICATIONS

"Privacy Protection for Social Networking APIs." Felt et al (pp. 1-8/2008).

\* cited by examiner

INTEGRATED PARONYMOUS NETWORK ADDRESS DETECTION

BACKGROUND

Some Internet fraud involves attempts by a fraudster to intrude on a legitimate user's authorized web session by executing parallel transactions alongside the legitimate user's transactions, hijacking the legitimate user's session for fraudulent purposes such as theft, defamation, vandalism, or notoriety. Often, the hijacking is executed by session fixation or as an external sidejacking, in which some or all of the hijacker's transactions are conveyed through separate channels from those of the legitimate user. For example, a sidejacker in a local area network (LAN) may use a separate channel to avoid detection by others in the LAN. In a man-in-the-browser attack, a fraudster may use a separate channel to avoid the additional delay of routing transactions through the legitimate user's browser. In a man-in-the-middle attack, a fraudster may use a separate channel to avoid selectively blocking responses to fraudulent requests from going back to the legitimate user.

A conventional approach to intrusion detection and prevention involves monitoring transmissions to a protected website for transmissions using more than a single concurrent IP address. Because such concurrent addresses may signify sidejacking or a related attack, the conventional approach further involves thwarting, delaying or isolating transactions with the protected website by such suspicious sources.

SUMMARY

Unfortunately, there are deficiencies with the above-referenced conventional approach to intrusion detection and prevention. For example, the conventional approach may falsely indicate that valid transmissions to the protected resource are suspicious, thus erroneously hindering legitimate users from conducting business, at substantial cost to both parties. Such errors often occur because, to increase information transmission throughput, legitimate users may use parallel concurrent connections, which may have different IP addresses. A conventional remedy is to compute the proximity of the IP addresses' purported geolocations, trading some false positive errors for false negative errors. The method of blocking a known set of IP addresses of prior known attackers, for example a botnet attack, may unintentionally block some transmissions because, in general, botnet participants are unknowingly involved in attacks by downloaded malware, and may be legitimate customers. Conversely, using lists of suspect IP addresses, for example those generated by security organizations or prior attacks, and thwarting transactions by those sources may fail to prevent fraud from those sources if they disguise their IP addresses through anonymizing networks.

In contrast with the conventional approach to intrusion detection which may hinder a legitimate user from conducting business or fail to detect an external sidejacking attack or fail to correlate anonymous or pseudonymous connections, improved techniques involve comparing paronymous addresses received in transaction data with trusted sets of paronymous data stored in a database by both a trusted client computer and a trusted server computer. Along these lines, the trusted client computer sends data packets to the trusted server computer that contain network addresses and a secure identifier. In response, the trusted server computer sends acknowledgment data packets containing encrypted network addresses and the secure identifier. Upon sending the acknowledgement data packets, the server computer communicates the network addresses to an aggregator. When the client computer receives the acknowledgement data packets, the client computer communicates the network addresses to the aggregator. Once the aggregator receives transaction data containing paronymous addresses, the aggregator compares the paronymous addresses to those communicated to it by the trusted server and client computers. Based on the comparison, the aggregator determines the likelihood that the paronymous addresses are legitimately synonymous.

Advantageously, the improved techniques make it possible to detect sidejacking attacks or correlate anonymous and/or pseudonymous connections.

One embodiment of the improved techniques is directed to a computer-based method of monitoring electronic transactions between a client computer and a server computer. The method includes receiving transaction data resulting from an electronic transaction between the client computer and the server computer, the transaction data including a set of paronymous addresses. The method also includes a comparison operation between the set of paronymous addresses included in the transaction data and trusted sets of paronymous addresses stored in a paronymous address database to produce a comparison result. The method further includes generating a score based on the comparison result, the score indicating a likelihood that the paronymous addresses of the set of paronymous addresses are legitimately synonymous.

Another embodiment of the improved techniques is directed to a computer program product having a non-transitory computer readable medium storing a set of instructions for monitoring electronic transactions between a client computer and a server computer, the set of instructions causing a processor device to perform the above-described method of monitoring electronic transactions between a client computer and a server computer.

Yet another embodiment of the improved techniques includes an electronic apparatus. The electronic apparatus includes a network interface, a memory and processing circuitry coupled to the network interface and the memory. The processing circuitry is constructed and arranged to perform the above-described method of monitoring electronic transactions between a client computer and a server computer.

BRIEF DESCRIPTION OF THE DRAWINGS

The foregoing and other objects, features and advantages will be apparent from the following description of a particular arrangement of the invention, as illustrated in the accompanying drawings in which like reference characters refer to the same parts throughout the different views. The drawings are not necessarily to scale, emphasis instead being placed upon illustrating the principles of various arrangements of the invention.

DETAILED DESCRIPTION

Improved techniques involve comparing paronymous addresses received in transaction data with trusted sets of paronymous data stored in a database by both a trusted client computer and a trusted server computer. Along these lines, the trusted client computer sends data packets to the trusted server computer that contain network addresses and a secure identifier. In response, the trusted server computer sends acknowledgment data packets containing encrypted network addresses and the secure identifier. Upon sending the acknowledgement data packets, the server computer communicates the network addresses to an aggregator. When the client computer receives the acknowledgement data packets, the client computer communicates the network addresses to the aggregator. Once the aggregator receives transaction data containing paronymous addresses, the aggregator compares the paronymous addresses to those communicated to it by the trusted server and client computers. Based on the comparison, the aggregator determines the likelihood that the paronymous addresses are legitimately synonymous.

Figure 1:
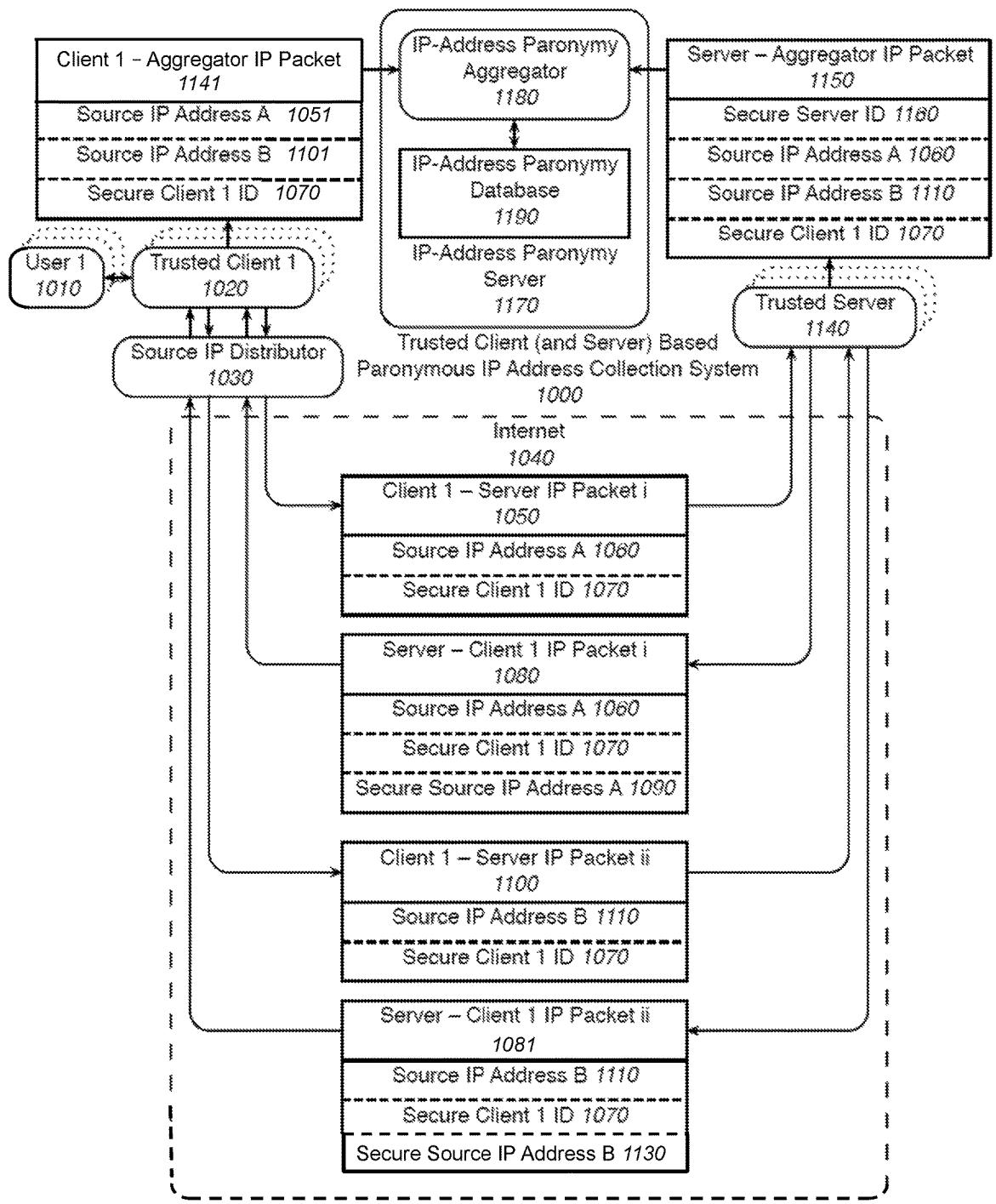
FIG. 1 is a block diagram illustrating an example collection of data from a trusted client computer and trusted server computer according to the improved techniques.

FIG. 1 illustrates an example trusted client and server-based paronymous IP address collection system 1000 according to the improved techniques. The system 1000 includes a trusted client 1020, a source IP distributor 1030, a trusted server 1140, and a paronymy server 1170.

The trusted client 1020 and the trusted server 1140 each are computers constructed and arranged to send and receive data packets such as packets 1050, 1080, and 1100. The trusted client 1020 and the trusted server 1140 are each also constructed and arranged to communicate data with the paronymy server 1170.

The source IP distributor 1030 distributes IP addresses to each outgoing data packet from the trusted client 1020. For example, the IP distributor may assign IP addresses from a specified range according to a network budget, a service level agreement, or the like.

The paronymy server 1170 is constructed and arranged to store sets of paronymous IP addresses received from the trusted client 1020 and the trusted server 1140. The paronymy server 1170 is further constructed and arranged to receive paronymous addresses as part of transaction data via client computers that may or may not be trusted and compare those paronymous addresses with those stored previously.

During operation, the trusted client 1020 sends a first data packet 1050 to the trusted server 1140. The packet 1050 includes information such as an IP address "A" 1060 designated by the distributor 1030 and a secure client identifier 1070. In some arrangements, the secure client identifier 1070 is a SSL session identifier. In other arrangements, the secure client identifier 1070 is a TLS session identifier.

Upon receipt of the packet 1050, the trusted server 1140 sends a return packet 1080 to the trusted client 1020. The return, or acknowledgment packet 1080 includes the IP address 1060 and identifier 1070, and also includes a secure source IP address 1090. The secure source IP address 1090 is, in some arrangements, an encrypted version of the IP address 1060. In further arrangements, the encryption is a public key encryption.

After receiving the acknowledgment packet 1080, the trusted client 1020 sends a second packet 1100 to the trusted server 1140. This second packet 1100 contains the identifier 1070 but contains a different IP address "B" 1110. Upon receipt, the trusted server computer 1140 sends an acknowledgment packet 1081 containing the address 1110, the identifier 1070, and a secure address 1130.

Upon sending the acknowledgment packet 1081, the trusted server 1140 forms an aggregator packet 1150 containing the addresses 1060 and 1110, the secure client identifier 1070, and a secure server identifier 1160. The trusted server 1140 then sends this aggregator packet 1150 to an IP address aggregator 1180 in the paronymy server 1170. The aggregator 1180 records the time at which the packet 1150 was received.

Further, upon receiving the acknowledgment packet 1081, the trusted client 1020 forms an aggregator packet 1141 containing the addresses 1051 and 1101, and the secure client identifier 1070. The trusted client 1020 then sends this aggregator packet 1141 to the IP address aggregator 1180. The aggregator 1180 records the time at which the packet 1141 was received.

Upon receiving the packets 1140 and 1150 from the trusted client and the trusted server, respectively, the aggregator stores the information contained in the packet 1150 in a paronymy database 1190.

Figure 2:
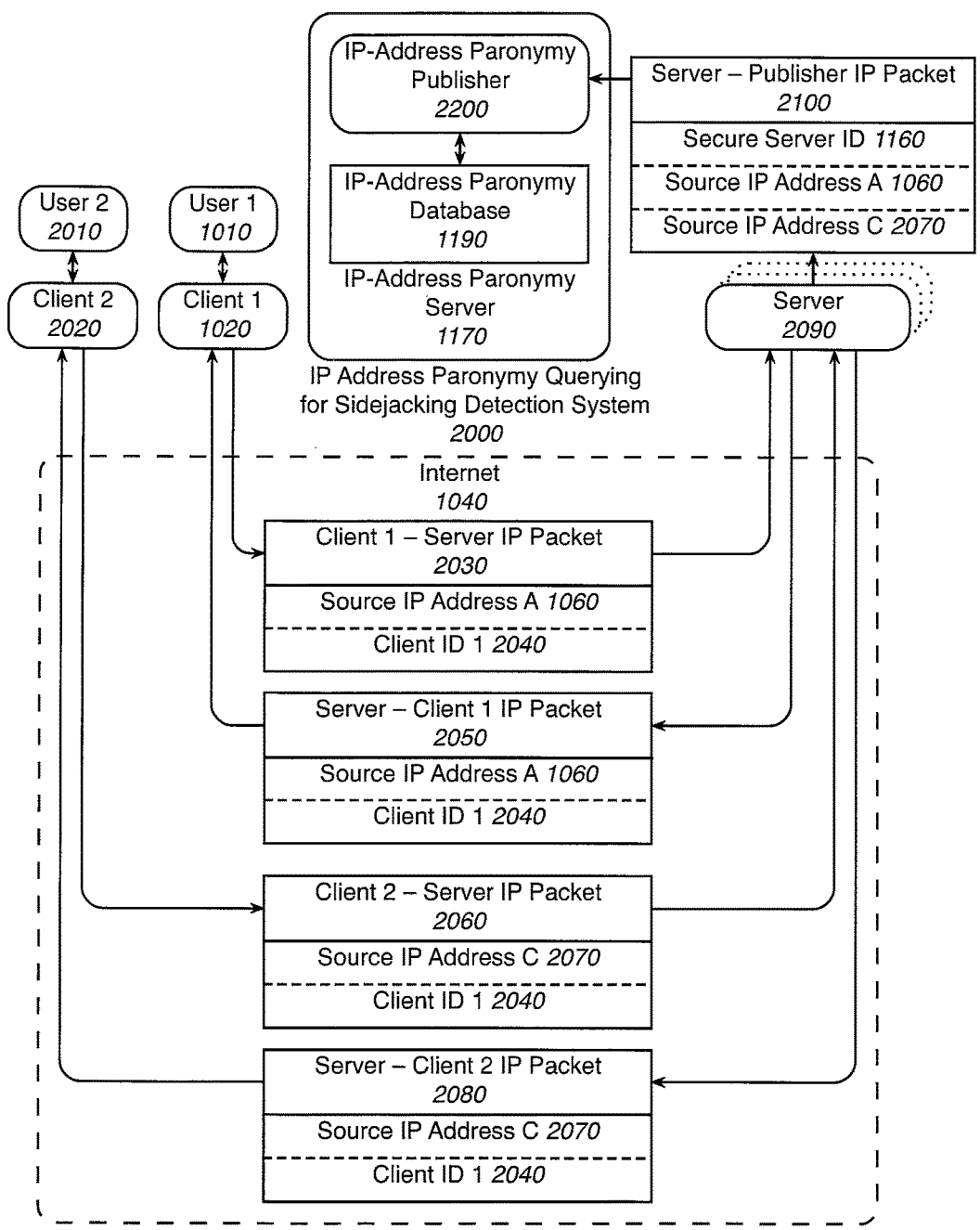
FIG. 2 is a block diagram illustrating an example sidejacking detection according to the improved techniques.

FIG. 2 illustrates an example query for sidejacking detection 2000. In this case, a user 1010 at a client 1020 sends a packet 2030 to a server 2090 for processing as part of a transaction. The packet 2030 contains an IP address "A" 1060 and a client identifier 2040. Meanwhile, another user 2010 at another client 2020 attempts to pose as the user 1010 by sending a packet 2060 with an address "C" 2070, but with the same client identifier 2040 as that sent by the first client 1020. This is an example of a sidejacking attack in which one user poses as another user close by.

Upon receipt of packets 2030 and 2060, the server 2090 forms a publisher IP packet 2100 containing the IP addresses 1060 and 2070, along with a secure server identifier 1160. A paronymy publisher 2200 in the paronymy server 1170 compares the IP addresses 1060 and 2070 with previously stored paronymous IP addresses. Based on the comparison, which in this case is between pairs (A,B) and (A,C), the paronymy server 1170 generates a score indicating how risky the transactions are.

Figure 3:
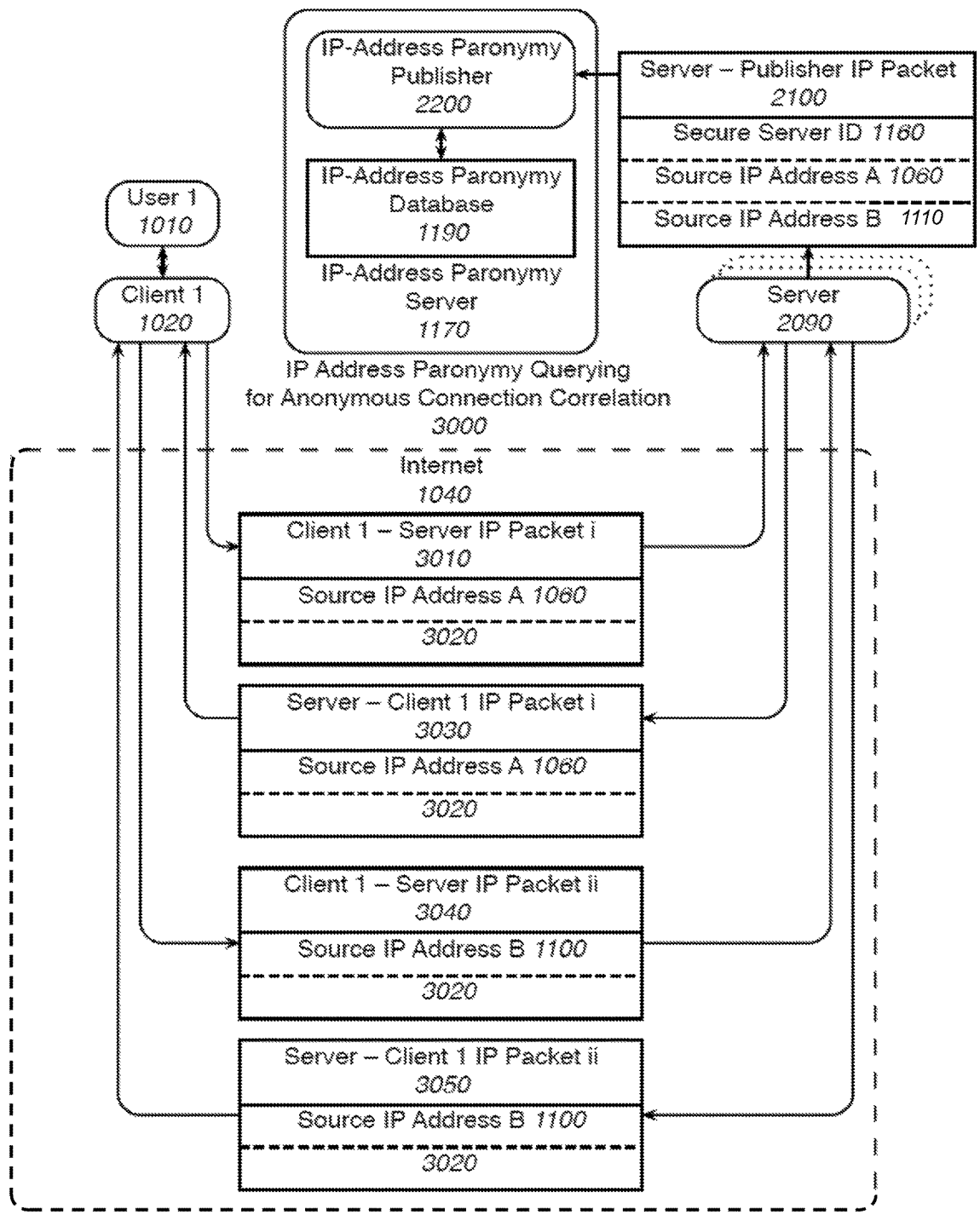
FIG. 3 is a block diagram illustrating an example query for an anonymous connection correlation according to the improved techniques.

FIG. 3 illustrates an example query for anonymous connection correlation 3000. In this case, a single user 1010 on client 1020 sends packets i 3010 and ii 3040 (with respective acknowledgment packets sent by the server 2090) to the server 2090. The packets 3010 and 3040 each only have IP addresses 1060 and 1100, respectively, with no client identifiers. In this case, the publisher packet 2100 generated by the server 2090 again contains addresses 1060 and 1110 and the secure server ID 1160. Again, the paronymy publisher 2200 may still determine whether the packets came from the same client 1020 by comparing the addresses received in the packet 2100 against those stored in the database 1190.

Figure 4:
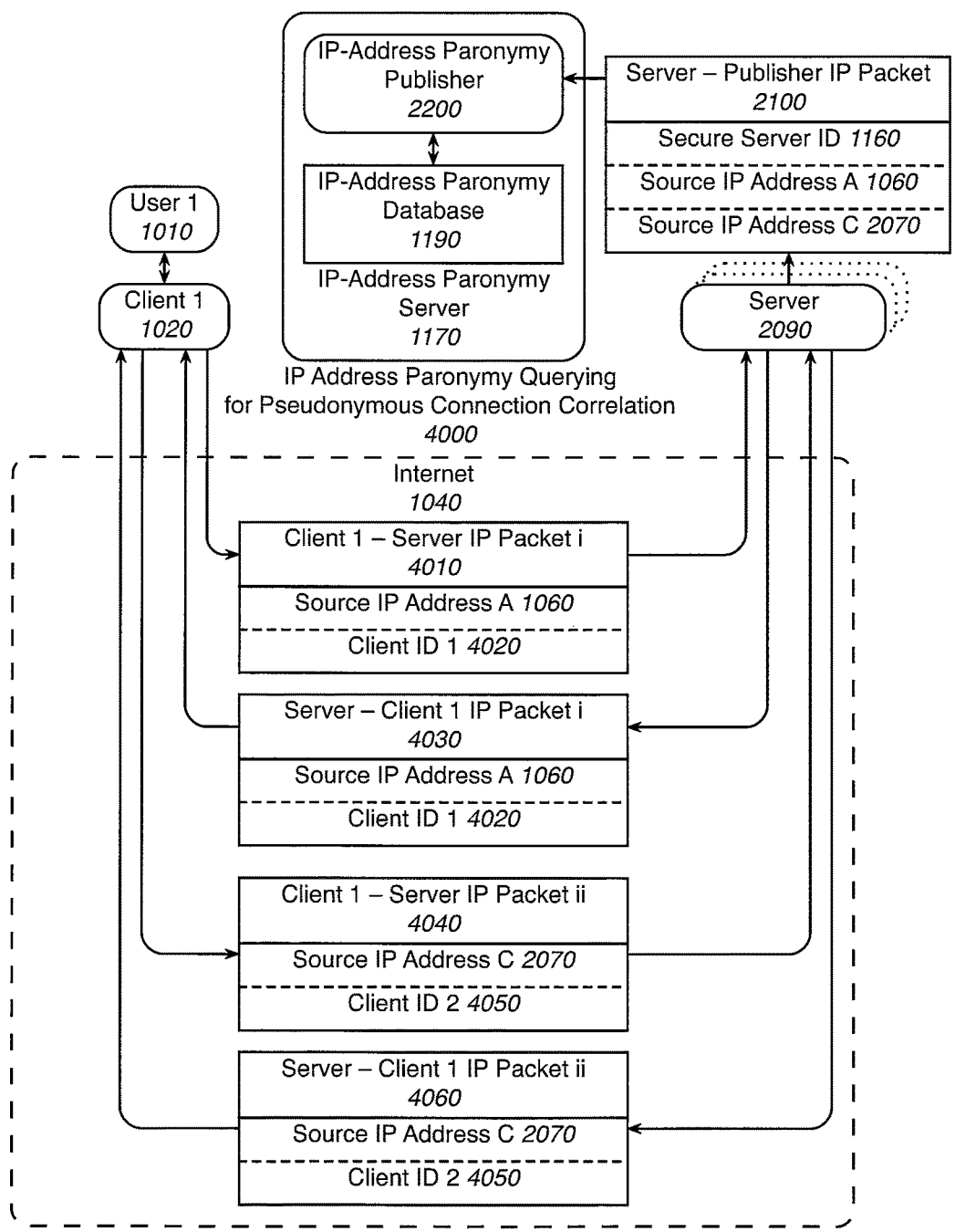
FIG. 4 is a block diagram illustrating an example query for an psuedonymous connection correlation according to the improved techniques.

FIG. 4 illustrates an example query for psuedonymous connection correlation 4000. In this case, a single user 1010 on client 1020 sends packets i 4010 and ii 4040 (with respective acknowledgment packets sent by the server 2090) to the server 2090. The packets 4010 and 4040 each have IP addresses 1060 and 2070 and respective client identifiers 4020 and 4050, respectively. In this case, the publisher packet 2100 generated by the server 2090 again contains addresses 1060 and 2070 and the secure server identifier 1160. Again, the paronymy publisher 2200 may still determine whether the packets came from the same client 1020 by comparing the addresses received in the packet 2100 against those stored in the database 1190.

Figure 5:
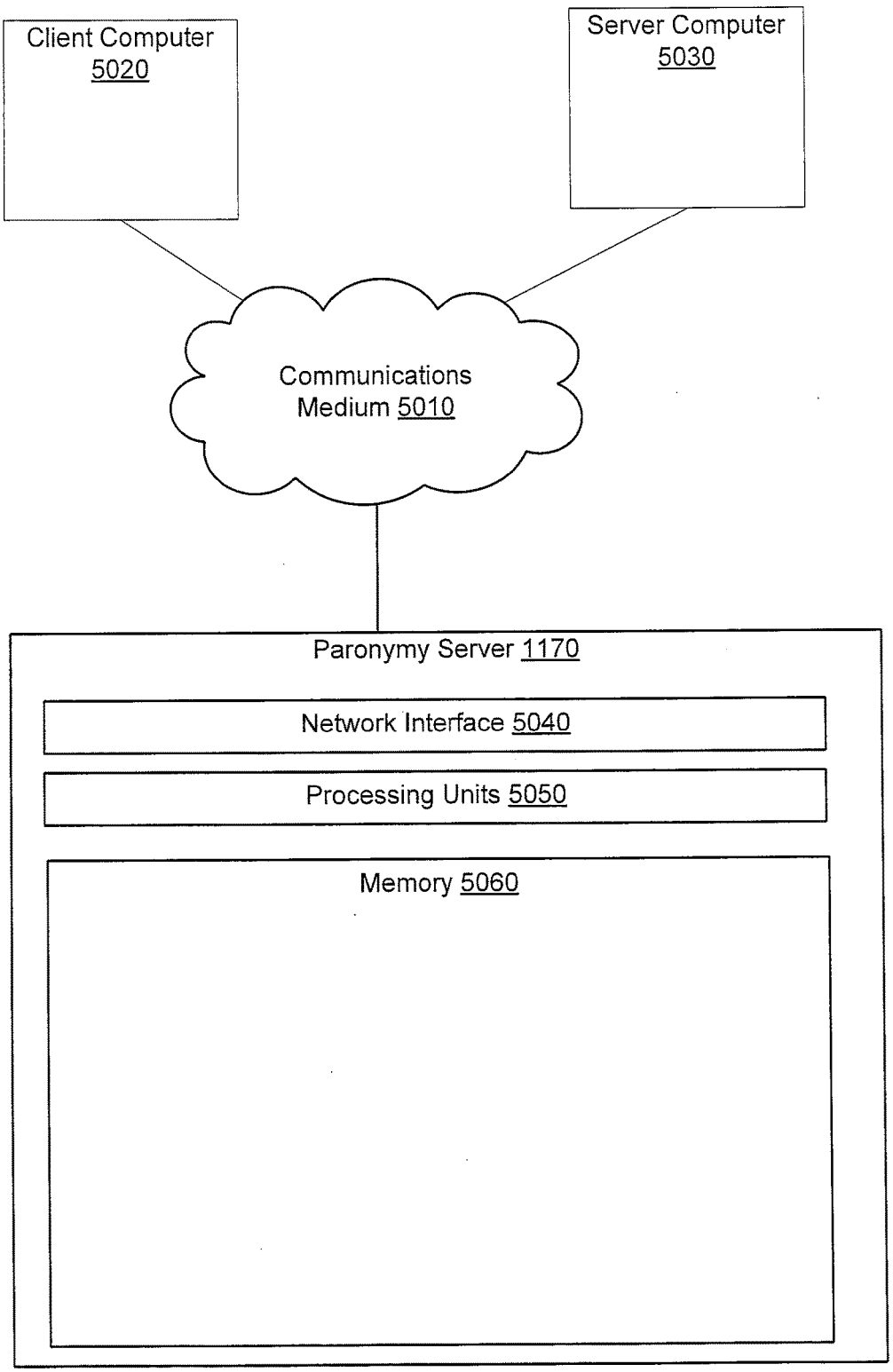
FIG. 5 is a block diagram illustrating an example paronymy server within an electronic environment according to the improved techniques.

FIG. 5 illustrates an example paronymy server 1170 connected to a client computer 5020 and a server computer 5030 via communications medium 5010. The paronymy server 1170 includes a network interface 5040, processing units 5050, and memory 5060 to which the processing units 5050 are coupled. The network interface 5040 includes, for example, adapters, such as SCSI target adapters and network interface adapters, for converting electronic and/or optical signals received from the communications medium 5010 to electronic form for use by the paronymy server 1170. The processing units 5050 include one or more processing chips and/or assemblies. In a particular example, the processing units 5050 include multi-core CPUs. The memory 5060 includes both volatile memory (e.g., RAM), and non-volatile memory, such as one or more ROMs, disk drives, solid state drives, and the like. The processing units 5050 and the memory 5060 together form control circuitry, which is constructed and arranged to carry out various functions as described herein.

The communications medium 5010 provides network connections among the client computer 5020, the server computer 5030, and the paronymy server 1170. Communications medium 5010 may implement any of a variety of protocols and topologies that are in common use for communications over the Internet 1040. Furthermore, communications medium 5010 may include various components (e.g., cables, switches/routers, gateways/bridges, etc.) that are used in such communications.

Figure 6:
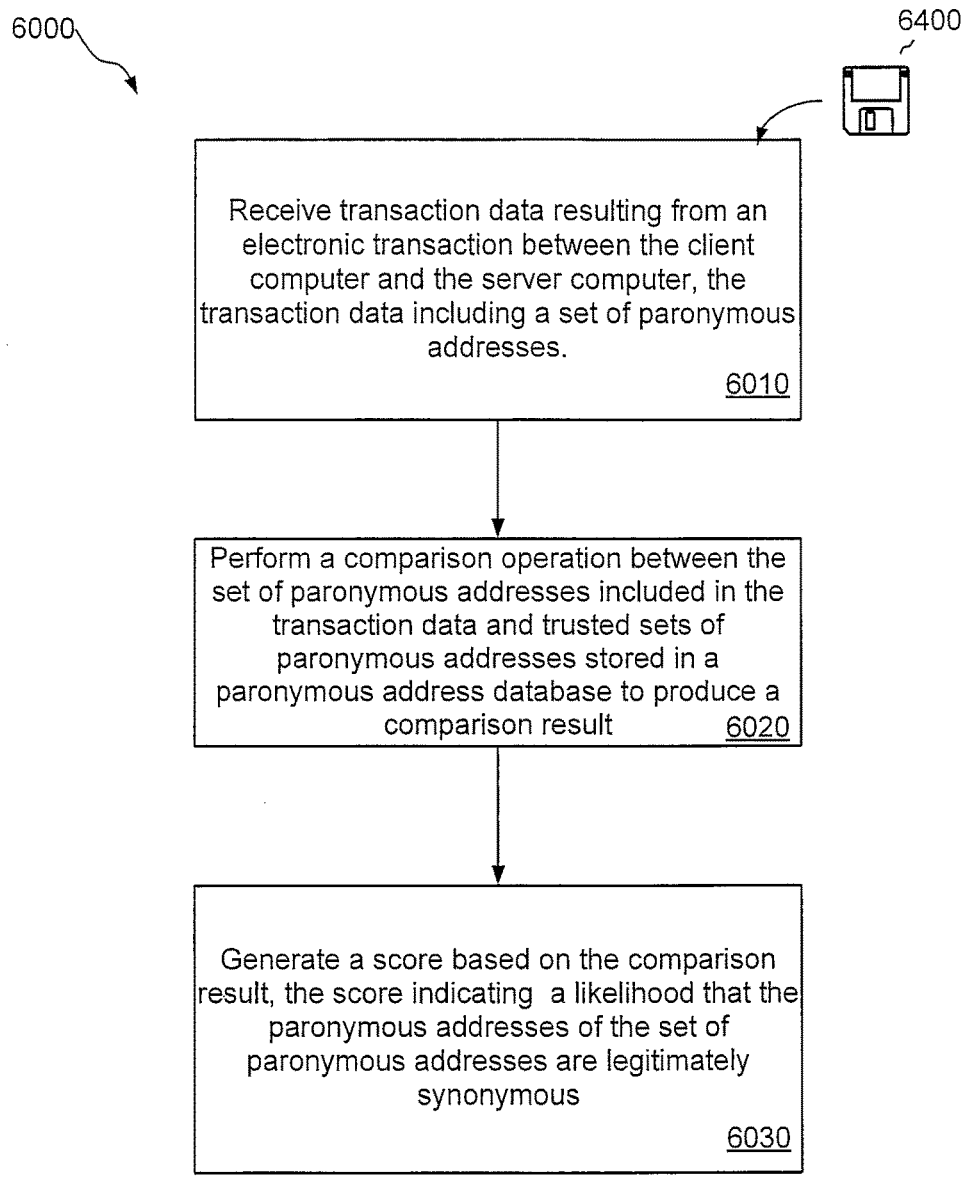
FIG. 6 is a flow chart illustrating an example method of carrying out the improved techniques.

FIG. 6 illustrates a method 6000 of carrying out the improved techniques. The method 6000 may be performed by software constructs stored in memory 5060 in connection with FIG. 5 and run by the processing units 5050.

At 6010, transaction data resulting from an electronic transaction between the client computer and the server computer is received, the transaction data including a set of paronymous addresses.

At 6020, a comparison operation between the set of paronymous addresses included in the transaction data and trusted sets of paronymous addresses stored in a paronymous address database is performed to produce a comparison result.

At 6030, a score based on the comparison result is generated, the score indicating a likelihood that the paronymous addresses of the set of paronymous addresses are legitimately synonymous.

While various arrangements of the invention have been particularly shown and described, it will be understood by those skilled in the art that various changes in form and details may be made therein without departing from the spirit and scope of the invention as defined by the appended claims.

Although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 6400 in FIG. 6). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A computer-based method of monitoring electronic transactions between a client computer and a server computer, the computer-based method comprising:
   receiving, at processing circuitry, a trusted set of paronymous addresses from a trusted server computer in response to the trusted server computer receiving first packets of data from a trusted client computer, each first packet of data including an address of the trusted set of paronymous addresses;
   receiving, at the processing circuitry, the trusted set of paronymous addresses from the trusted client computer in response to the trusted client computer receiving, at a client time, second packets of data sent, at a server time, from the trusted server computer, each second packet of data including the address of the trusted set of paronymous addresses;
   and
   generating, by the processing circuitry, a score by evaluating a difference between the client time and the server time, a likelihood that each of the paronymous addresses of the set of paronymous addresses are legitimately synonymous being based on the difference.

2. A computer-based method as in claim 1, further comprising:
   storing the trusted set of paronymous addresses in a paronymous address database.

3. A computer-based method as in claim 2, further comprising:
   in response to receiving the trusted set of paronymous addresses from the trusted server computer, recording the server time at which the second packets of data were sent from the trusted server computer; and
   in response to receiving the trusted set of paronymous addresses from the trusted client computer, recording the client time at which the second packets of data were received at the trusted client computer.

4. A computer-based method as in claim 3, further comprising:
   recording a time at which transaction data is received at the processing circuitry, the transaction data resulting from an electronic transaction between the client computer and the server computer, the transaction data including the trusted set of paronymous addresses,
   wherein generating the score includes computing an age component of the score, the age component decreasing exponentially with a difference between the time at which the transaction data is received at the processing circuitry and the server time.

5. A computer-based method as in claim 2, wherein each of the first packets of data further includes a secure client identifier identifying the trusted client computer,
wherein each of the second packets of data further includes an encrypted address of the trusted set of paronymous addresses, and
wherein the method further comprises receiving, with the trusted set of paronymous addresses, the secure client identifier and a secure server identifier identifying the trusted server computer.

6. A computer-based method as in claim 2, wherein the trusted set of paronymous addresses is sent by both the trusted server computer and the trusted client computer, the identity of the trusted server being verified by a secure trusted-server identifier, the identity of the trusted client being verified by a secure trusted client identifier, and
wherein the method further comprises verifying the trusted set of paronymous addresses in response to the same set of paronymous addresses being received from each of the trusted server computer and the trusted client computer in a temporal and causal relationship.

7. A computer-based method as in claim 1, further comprising:
receiving, by the processing circuitry, transaction data resulting from an electronic transaction between the client computer and the server computer, the transaction data including the trusted set of paronymous addresses; and
performing, by the processing circuitry, a comparison operation between the set of paronymous addresses included in the transaction data and trusted sets of paronymous addresses stored in a paronymous address database to produce a comparison result,
wherein generating the score includes generating, by the processing circuitry, the score based on the comparison result.

8. A computer program product having a non-transitory computer readable medium which stores a set of instructions for monitoring electronic transactions between a client computer and a server computer, the set of instructions causing a processor device to perform a method comprising:
receiving, at processing circuitry, a trusted set of paronymous addresses from a trusted server computer in response to the trusted server computer receiving first packets of data from a trusted client computer, each first packet of data including an address of the trusted set of paronymous addresses;
receiving, at the processing circuitry, the trusted set of paronymous addresses from the trusted client computer in response to the trusted client computer receiving, at a client time, second packets of data sent, at a server time, from the trusted server computer, each second packet of data including the address of the trusted set of paronymous addresses;
and
generating a score by evaluating a difference between the client time and the server time, a likelihood that each of the paronymous addresses of the set of paronymous addresses are legitimately synonymous being based on the difference.

9. A computer program product as in claim 8, wherein the method further comprises:
storing the trusted set of paronymous addresses in a paronymous address database.

10. A computer program product as in claim 9, wherein the method further comprises:
in response to receiving the trusted set of paronymous addresses from the trusted server computer, recording the server time at which the second packets of data were sent from the trusted server computer; and
in response to receiving the trusted set of paronymous addresses from the trusted client computer, recording the client time at which the second packets of data were received at the trusted client computer.

11. A computer program product as in claim 10, wherein the method further comprises:
recording a time at which transaction data is received at the processing circuitry, the transaction data resulting from an electronic transaction between the client computer and the server computer, the transaction data including the trusted set of paronymous addresses,
wherein generating the score includes computing an age component of the score, the age component decreasing exponentially with a difference between the time at which the transaction data is received at the processing circuitry and the server time.

12. A computer program product as in claim 9, wherein each of the first packets of data further includes a secure client identifier identifying the trusted client computer,
wherein each of the second packets of data further includes an encrypted address of the trusted set of paronymous addresses, and
wherein the method further comprises receiving, with the trusted set of paronymous addresses, the secure client identifier and a secure server identifier identifying the trusted server computer.

13. A computer program product as in claim 9, wherein the trusted set of paronymous addresses is sent by both the trusted server computer and the trusted client computer, the identity of the trusted server being verified by a secure trusted-server identifier, the identity of the trusted client being verified by a secure trusted client identifier, and
wherein the method further comprises verifying the trusted set of paronymous addresses in response to the same set of paronymous addresses being received from each of the trusted server computer and the trusted client computer in a temporal and causal relationship.

14. An electronic apparatus, comprising:
a network interface;
memory; and
processing circuitry coupled to the memory, the processing circuitry, being constructed and arranged to:
receive a trusted set of paronymous addresses from a trusted server computer in response to the trusted server computer receiving first packets of data from a trusted client computer, each first packet of data including an address of the trusted set of paronymous addresses;
receive the trusted set of paronymous addresses from the trusted client computer in response to the trusted client computer receiving, at a client time, second packets of data sent, at a server time, from the trusted server computer, each second packet of data including the address of the trusted set of paronymous addresses;
and
generate a score by evaluating a difference between the client time and the server time, a likelihood that each of the paronymous addresses of the set of paronymous addresses are legitimately synonymous being based on the difference.

15. An electronic apparatus as in claim 14, wherein the controlling circuitry is further constructed and arranged to:
store the trusted set of paronymous addresses in a paronymous address database.

16. An electronic apparatus as in claim 15, wherein the controlling circuitry is further constructed and arranged to:
in response to receiving the trusted set of paronymous addresses from the trusted server computer, record the server time at which the second packets of data were sent from the trusted server computer; and
in response to receiving the trusted set of paronymous addresses from the trusted client computer, record the client time at which the second packets of data were received at the trusted client computer.

17. An electronic apparatus as in claim 16, wherein the controlling circuitry is further constructed and arranged to record a time at which transaction data is received at the processing circuitry, the transaction data resulting from an electronic transaction between the client computer and the server computer, the transaction data including the trusted set of paronymous addresses, and
wherein the controlling circuitry constructed and arranged to generate the score is further constructed and arranged to compute an age component of the score, the age component decreasing exponentially with a difference between the time at which the transaction data is received at the processing circuitry and the server time.

18. An electronic apparatus as in claim 15, wherein each of the first packets of data further includes a secure client identifier identifying the trusted client computer,
wherein each of the second packets of data further includes an encrypted address of the trusted set of paronymous addresses, and
wherein the controlling circuitry is further constructed and arranged to receive, with the trusted set of paronymous addresses, the secure client identifier and a secure server identifier identifying the trusted server computer.

19. An electronic apparatus as in claim 15, wherein the trusted set of paronymous addresses is sent by both the trusted server computer and the trusted client computer, the identity of the trusted server being verified by a secure trusted-server identifier, the identity of the trusted client being verified by a secure trusted client identifier, and
wherein the controlling circuitry is further constructed and arranged to verify the trusted set of paronymous addresses in response to the same set of paronymous addresses being received from each of the trusted server computer and the trusted client computer in a temporal and causal relationship.

* * * * *